(12) United States Patent
Peterson et al.

(10) Patent No.: US 6,502,137 B1
(45) Date of Patent: Dec. 31, 2002

(54) SYSTEM AND METHOD FOR TRANSFERRING INFORMATION OVER A COMPUTER NETWORK

(75) Inventors: Lynn Erich Peterson, Raleigh, NC (US); Mack Edward Phelps, Raleigh, NC (US); Gary Roy Shippy, Cary, NC (US); John Douglas Wright, Putnam Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/948,210

(22) Filed: Oct. 9, 1997

(51) Int. Cl.[7] .................................................. H04K 1/00
(52) U.S. Cl. ........................ 709/229; 709/224; 713/202
(58) Field of Search ........................... 379/90.01, 93.07, 379/93.12, 93.14, 93.17; 707/500, 104, 9, 224; 709/229, 224, 226, 228; 713/202; 705/51, 52

(56) References Cited

U.S. PATENT DOCUMENTS

| | | | |
|---|---|---|---|
| 4,949,248 A | | 8/1990 | Caro ........................... 364/200 |
| 5,550,982 A | | 8/1996 | Long et al. .................. 395/200 |
| 5,557,724 A | | 9/1996 | Sampat et al. ............... 395/157 |
| 5,568,181 A | | 10/1996 | Greewood et al. ............. 348/7 |
| 5,572,643 A | * | 11/1996 | Judson .................. 395/200.48 |
| 5,572,645 A | | 11/1996 | Dan et al. .................... 395/501 |
| 5,586,264 A | | 12/1996 | Belknap et al. ........ 395/200.08 |
| 5,594,491 A | | 1/1997 | Hodge et al. ................... 378/7 |
| 5,610,653 A | * | 3/1997 | Abecassis ................... 348/170 |
| 5,678,041 A | * | 10/1997 | Baker et al. ................. 395/609 |
| 5,737,619 A | * | 4/1998 | Judson ........................ 707/500 |
| 5,769,269 A | * | 6/1998 | Peters ......................... 370/15 |
| 5,784,460 A | * | 7/1998 | Blumenthal .................... 380/4 |
| 5,796,952 A | * | 8/1998 | Davis et al. ............ 395/200.54 |
| 5,815,665 A | * | 9/1998 | Teper et al. ................. 709/229 |
| 5,838,682 A | * | 11/1998 | Dekelbaum et al. ......... 370/401 |
| 5,862,220 A | * | 1/1999 | Perlman ....................... 380/21 |
| 5,864,871 A | * | 1/1999 | Kitain ......................... 707/104 |
| 5,930,792 A | * | 7/1999 | Polcyn .......................... 707/9 |

FOREIGN PATENT DOCUMENTS

| | | | | |
|---|---|---|---|---|
| GB | 2299424 | 10/1995 | ........... | G06F/12/06 |
| TW | 273061 | 9/1995 | ........... | H04L/29/06 |
| WO | WO 96/17306 | 6/1996 | ........... | G06F/15/16 |
| WO | WO 96/17313 | 6/1996 | ........... | G06F/17/30 |

OTHER PUBLICATIONS

Kristol & Montulli, "HTTP State Management Mechanism," *Standards Track*, Feb. 1997.

* cited by examiner

*Primary Examiner*—Ayaz Sheikh
*Assistant Examiner*—Khanh Quang Dinh
(74) *Attorney, Agent, or Firm*—Winstead Sechrest & Minick; Scott W. Reid

(57) ABSTRACT

Upon the receipt by an HTTP server over the Internet from a web browser for title information for audio or video data, the HTTP server retrieves the title information and sends it to the web browser along with a passcode particularly associated with the requested title information. Then, when an application server coupled to the HTTP server receives a request for the audio or video data from a viewer application associated with a web browser, the audio or video data will only be sent from a video server to the viewer application over the Internet if the request for the audio or video data is accompanied by the passcode. After sending the audio or video data to the viewer application, the passcode is invalidated. If the request for the audio or video data requests titles other than those associated with the passcode, the request is denied.

21 Claims, 6 Drawing Sheets

SYSTEM AND METHOD FOR TRANSFERRING INFORMATION OVER A COMPUTER NETWORK

TECHNICAL FIELD

The present invention relates in general to information networks, and in particular, to transmission of data over the Internet.

BACKGROUND INFORMATION

With the rapid growth of the Internet and improvements in computer technology, the demand for transfers of audio and video data over the Internet will increase dramatically. Within the Internet, navigation and selection from video/audio sources are accomplished using web browser technology within an HTTP (HyperText Transfer Protocol) server. Video/audio selection can be accomplished in many application scenarios, from selection from a simple list to multimedia objects being integrated in the documents implementing an application.

Transfer of audio/video data over the Internet is typically enabled in response to a client computer web browser. As a result of such a web browsing process, metadata is returned from an application server, which is coupled to an HTTP (or other) server, to the client computer via the HTTP server. This metadata causes a helper application, or video/audio viewer, to be started in the client computer. The metadata is passed to this helper application, or viewer, and is used to initialize the client subsystem for the playback, to get connected to the application server for control functions, and to obtain loading and starting of the requested video/audio title(s). Information in the metadata includes an address of the application server, the identifier (unique title) for the file to be played, the type of encoding of the video/audio data, the bit rate of the encoded video/audio data, etc.

Using the received metadata, all interaction to request and control the play of video/audio data is accomplished between the client computer and the application server over an established link. Opening the session will result in a separate logical connection, which carries the digitized video between the video server, coupled to the application server, and the client computer. VCR-like control of the video is then supported over the client-to-application server link.

Access control, billing initiation, rights management functions, etc. will be part of the video/audio navigation and selection functions provided by the CGI (common gateway interface) programs in the HTTP server (or by programs in other types of servers: e.g., digital library search server). Having provided these functions at this level, a mechanism is required between the client computers and application server to provide security for the actual request and play of the video/audio data.

SUMMARY OF THE INVENTION

The present invention addresses the foregoing need by providing a security mechanism for implementation where a client computer has requested video/audio data from an application server coupled to an HTTP server. The security mechanism limits access to the application server by only those client computers with approved video requests (as determined by the application in the HTTP server application). Once a client computer is connected to the application server, the client computer is limited to playing only those titles originally selected during the navigation and selection process with the HTTP server. The security mechanism inhibits a client computer's capability to intercept other client-approved requests, connect to the application server as a "valid" approved client, and then have the ability to play the video intended for the originally approved requester.

More specifically, upon the receipt of a request from a client computer, the application server produces a random passticket (e.g., an N-digit code) to be used by a client computer to make a valid connection to the application server. The application server-generated passticket is then included as an element in the metadata sent to the client computer. The application server maintains a copy of this passticket for client connection validation.

The application server may include a time-out period between sending a passticket in the metadata and a client computer's use of the passticket. With expiration of the timer without a use of the passticket by the client computer, the passticket is invalidated.

The application server maintains and associates with the passticket the requested title information, which is also returned as part of the metadata. When a client connects to the application server, the passticket is checked. The connection is rejected if the passticket is not currently valid in the application server. Once the passticket is validated with a user connect, it is then invalidated. When a client makes the play requests to the application server for a title, the title is validated against the titles associated with the passticket. Invalid title requests are rejected.

As the metadata is sent to the client computer over an open network, there is an exposure for another client computer to intercept and use the passticket (prior to the original requester's connection to the application server). This can be defended by scrambling (e.g., encryption) the application server-generated passticket using a key which is known by the client computer. This scrambling could be accomplished by the HTTP server application. Use of a secure sockets layer in a secure web server would provide this level of security. Key management between the client computer and the server would also be done at this level. In addition to the scrambling of the passticket, the title information may also be scrambled. This could make metadata interception and break-in even more difficult as the application server also validates the title against a valid connect (valid passticket).

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following description, numerous specific details are set forth such as specific word or byte lengths, etc. to provide a thorough understanding of the present invention. However, it will be obvious to those skilled in the art that the present invention may be practiced without such specific details. In other instances, well-known components have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Figure 1:
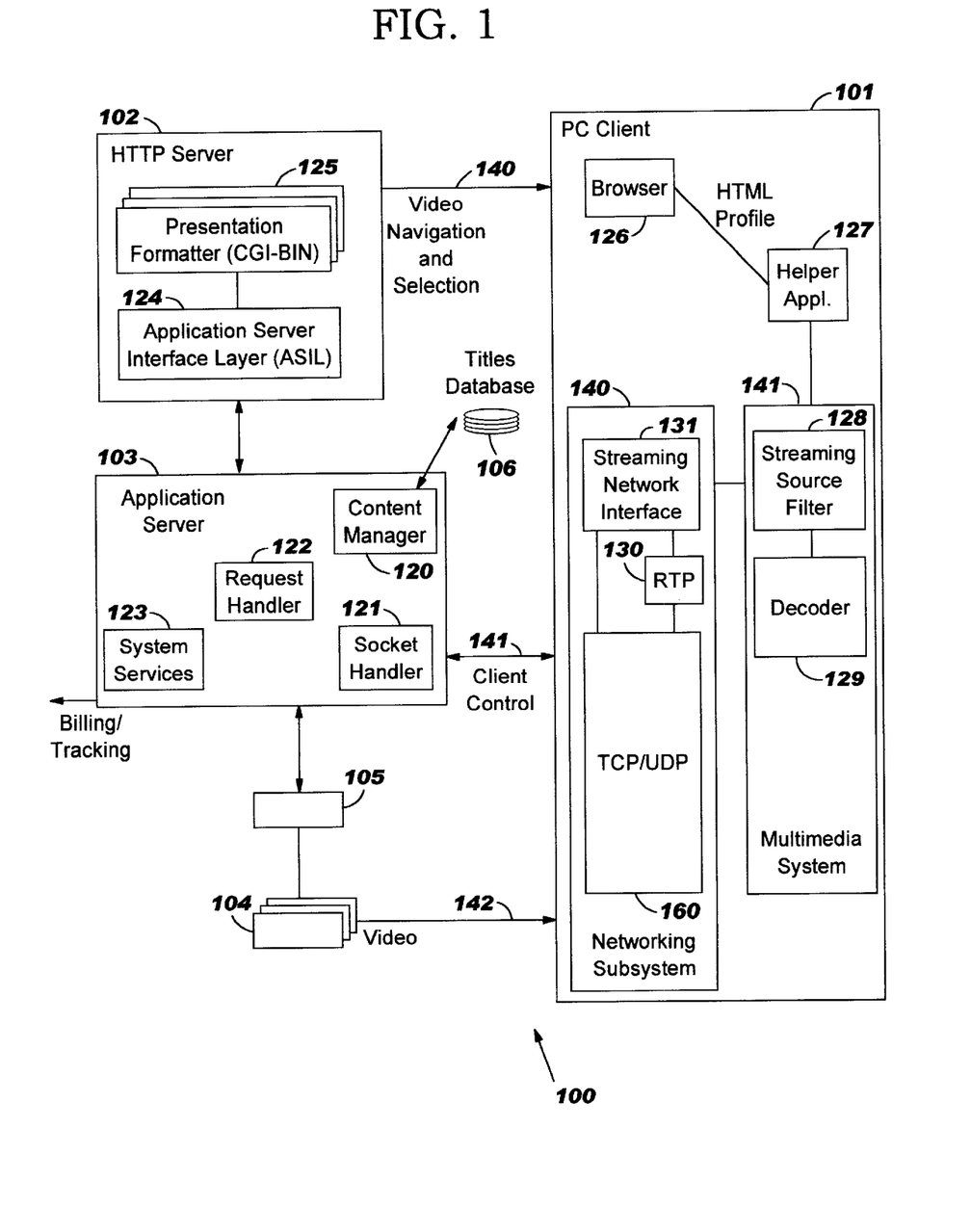
FIG. 1 illustrates an open network.

Referring to FIG. 1, there is illustrated components within open network (Internet) 100 whereby client computer 101 uses a web browser 126 to connect to HTTP server 102, and then through application server 103 requests the downloading of video/audio data from video/audio server 104. Hereinafter, the description of the present invention will be made with respect to the downloading of video. However, the description equally applies to the downloading of audio data.

Video server 104, which may include a video data pump, stores and "plays" video data (hereinafter sometimes referred to as "video") to client computer 101 over network 100. A video data pump is one or more machines responsible for saving the video on disks and then sending the video through the network 100 when a client 101 requests playback. The video data pump does some pacing functions with the RTP (real-time protocol) component 130 in the client computer 101 to ensure that video data is arriving at an acceptable rate for playback.

Control server 105 manages and controls video server(s) 104. More specifically, the control server 105 has a process that manages the load balancing for the video data pumps 104 and handles the loading and removing of video data from the video data pumps 104. Basically, the control server 105 manages which data pump a video should be played from and whether there is enough resources available to play the video (e.g., CPU power, network capacity, etc.).

HTTP server 102 may be a standard web server for HTML (HyperText Markup Language) document serving and CGI programs. CGI is an acronym for "common gateway interface." This is a defacto standard interface in most, if not all, HTTP servers. Documentation on CGI and its standard interface is available on the Internet (World Wide Web). The CGI provides a program developer a mechanism to extend the workings of an HTTP server (web server). CGI enables programmers to write code that extends the functionality of the HTTP server 102, such as retrieving and displaying data from a database, or customizing an output display based on a user's ID or input data.

When an HTTP server 102 receives an input message from a client browser 126, it contains a URL (Uniform Resource Locator) on the first line of the message. This is effectively a string of data that informs the HTTP server 102 what the request is for. The URL may translate to an HTML file name, which the HTTP server 102 will read and send back to the client 101. The URL may also translate into the name of a specific program which the HTTP server 102 will load and execute (similar to how a word processor program is opened on a personal computer by typing in the name of the program to execute).

For example, when a program is opened on a personal computer, the user sends an input via the keyboard and/or mouse, and receives the program's output on the computer output screen, or possibly as a file on a disk. An HTTP server 102 does not have quite the same capability, but it can start the CGI program, send it any input data received from the browser 126, and can then get the program's output data to send back to the client's browser 126.

When the CGI program is started, it can retrieve any data the browser 126 sent by reading from standard input (STDIN) and send any output back to the browser 126 by writing data to standard output (STDOUT). Standard input and standard output are terms used in numerous programming publications and in programming standards documents (American National Standards Institute, etc.). The details of how an HTTP server 102 gets the data to and from a CGI program is not important for purposes of describing the present invention; it is sufficient to state that any input data from the browser 126 can be passed to a CGI program, and the output data from a CGI program can be sent back to the browser 126.

The processing logic of a CGI program would typically be to retrieve the data a user sent (via STDIN), process that request (such as retrieve data from the database), and dynamically format an HTML output document based on the data retrieved.

The presentation formatter 125 is a CGI program which performs three functions: (1) evaluate the input, (2) interact with a back-end database or server (i.e., application server 103), and (3) send a response to the client 101. The majority of the presentation formatter code is title search logic, which evaluates the input request a user entered from client 101, retrieves the appropriate data from the content database (e.g., titles database 106), and then formats the response and sends an HTML response to the client's browser.

For example, the presentation formatter 125 may receive a request to list all the "action"titles in the database 106. It would then query the content database 106, receive a list including such movies as "Top Gun" and "Die Hard 2", then format an appropriate output HTML document and send it back to the client 101.

The presentation formatter 125 also handles requests to play a specific video. In this case, its actions are to evaluate the input, validate the video and retrieve a passticket for playback, then send the response to browser 126. The key difference in the response is that it does not send back an HTML document, but rather a metadata file, which then causes the browser 126 to start the helper application 127.

The application server interface layer (ASIL) 124 allows customers to customize the CGI programs by providing a simple interface to be able to access the data or select videos for playback in the application server 103. The ASIL 124 shields the presentation formatter 125 from complex programming, while the presentation formatter 125 controls video navigation and selection with respect to client computer 101. The application server 103 does not need to reside on the same physical computer as the HTTP server 102 (although it can). This complexity is masked by the ASIL 124 layer. A CGI program can perform a simple program call and the ASIL 124 takes care of any complex actions regarding locating and communicating with the application services component 103. In summary, the purpose of the ASIL 124 is to simplify interaction between services within application server 103 and the CGI program.

Application server 103 processes video control commands from clients (client computers). The content manager 120 within application server 103 retrieves information about video titles, which may be maintained within titles database 106.

The HTML browser 126 within client computer 101 may be a standard web browser for HTML document presentation. The viewer helper application 127 is the application within the client computer 101 for permitting a user to view video received from video server 104 over the Internet 100. Note, though the present invention makes reference to the Internet, the present invention may be implemented with respect to any computer network.

The RTP (Real-Time Transport) interface 130 within the networking subsystem 140 of client computer 101 handles delivery of video data from network 100. RTP is a documented Internet standard for the format of real-time video or audio data packets passed between computers. RTP 130 receives messages across the Internet in the RTP format (which has specific header and data portions), and handles the buffering of the data until it can be played on the client's computer screen (not shown). Video playback must have smooth data delivery, otherwise the video breaks up. The RTP sub-component 130 buffers the video data and delivers it at a smooth rate to avoid these problems. It is also responsible for slowing down the video coming in if the data is coming in too fast.

The multimedia subsystem 141 represents the code which actually plays the video and audio on client computer 101. For example, a Microsoft product called ActiveMovie may be utilized. Most video display products, like ActiveMovie, are designed to only play video coming from a file, either the client computer's 101 hard drive or a CD ROM. In Microsoft ActiveMovie, the program that reads video data from a file can be replaced with a program of the user's choice, so that the user can get the data from another source. That, in essence, is the purpose of the streaming source filter 128.

The streaming source filter 128 is code written by IBM to Microsoft ActiveMovie published interfaces, which provides encoded video/audio data to the ActiveMovie product whenever it asks for data. The streaming source filter 128 receives that data and controls video playback with calls to the streaming network interface 131. The streaming source filter 128 knows when to open or play a movie because ActiveMovie sends an open or play command, and ActiveMovie receives its open and play commands from the helper application 127 based on user input coming from the video display screen (not shown) on the client computer 101.

The decoders 129 are the portion of the multimedia subsystem 141 that are able to take the encoded video/audio data and actually convert that data into images and the sound. There are several types of encoded video data, such as QuickTime format, MPEG format, etc. Therefore, there are different decoders for each type of video data.

The networking subsystem 140 provides ability for the multimedia subsystem 141 to retrieve video data from the network 100, instead of reading from a file like most PC video products. The networking subsystem 140 provides similar capabilities to those that are available if the video data was stored on the client computer's 101 hard drive, such as the ability to fast forward to a specific point in the video file (like fast forwarding on a VCR), and to be able to provide the data in a timely fashion (since video playback is very time sensitive, data cannot be delayed in arriving at the screen or the video image will break up). The networking subsystem 140 is responsible for providing the function described above (via interaction with the application server 103) and is concerned with understanding the format of the data sent back and forth across the network 100, both the format of the video data buffers supplied across the network 100 and the format of the video control commands sent to the application server 103 to control video playback.

The streaming network interface 131 accepts requests for actions or video data from the streaming source filter 128 and takes appropriate action. For example, the streaming source filter 128 may start video playback via load and play commands (program calls) sent to the streaming network interface 131. The streaming network interface 131 would format those requests appropriately and send them to the application server 103, along with informing the RTP 130 to be prepared to start receiving video data. The streaming network interface 131 may then receive a request for video data, and then will retrieve the data from the RTP 130 and send it to the streaming source filter 128. The streaming network interface 138 is also responsible for detecting and reacting to network failures and notifying the streaming source filter 128 if such failures occur.

The TCP/UDP/IP component 160 is an industry standard communications code (stack) well-known within the art.

The application server 103 is the component that monitors and controls access to the video library. The purpose of the application server 103 is to ensure that videos selected by a user are only able to be played back by the same user utilizing the passticket implementation of the present invention. The application server 103 services all the calls that a CGI program can make to the ASIL 124. It does not do the user validation (verify a user is who they say they are by asking for a password). That is performed by the HTTP server 102 or a function within the CGI program.

The request handler 122 manages the interface to the control server 105 and handles the generation and tracking of passtickets in accordance with the present invention. The request handler 122 saves which videos can be played for a given passticket, does passticket validation when the client 101 sends in a passticket, and performs session and passticket time-out processes (e.g., throwing away a ticket that is past its expiration time). Request handler 122 communicates with the socket handler 121 to send and receive data from the client 101. The request handler 122 also tracks video playback time for billing information.

The socket handler 121 receives and decodes messages off the network 100 from clients 101, calls the appropriate processing routines in the request handler 122, and returns the responses in the appropriate network message. The socket handler 121 basically handles the communication flow between client 101 and application server 103.

The content manager 120 handles the descriptive database of video titles 106 and their associated data (video type, actors, date made, etc.). This function provides the ability to add, delete and search for titles. Content manager 120 is called by presentation formatter 125 routines (using the application services interface layer ASIL 124) to retrieve available title information for presentation to client computer 101. These routines are normally called when a user at client computer 101 is searching for a video to play and is looking through the list of available titles.

The system services component 123 handles the logging of messages generated by the other application services components and the retrieval of configuration data used by the other components. The messages logged consist of both error type messages and messages that can be used for billing purposes. The configuration information is used by the other components to configure their processing characteristics, for example, what the time-out value is for the passticket.

As discussed above, the browser 126 can send additional data with the URL request, and that data can be passed along to the CGI program. One of the two techniques for doing that is called form submission.

In the following figures, there is illustrated a detailed view of how the various components illustrated in FIG. 1 interact with each other in accordance with the present invention. The flows mainly show sequences of events. Single lines in the flows indicate component calls or TCP/IP communications. Double lines indicate RTP signalling or data transfer. Each line of the flow is annotated with the description of the interaction and where possible a description of the data used). Though the present invention is described with reference to the system described in FIG. 1, it can be implemented in any equivalent system.

Figure 2:
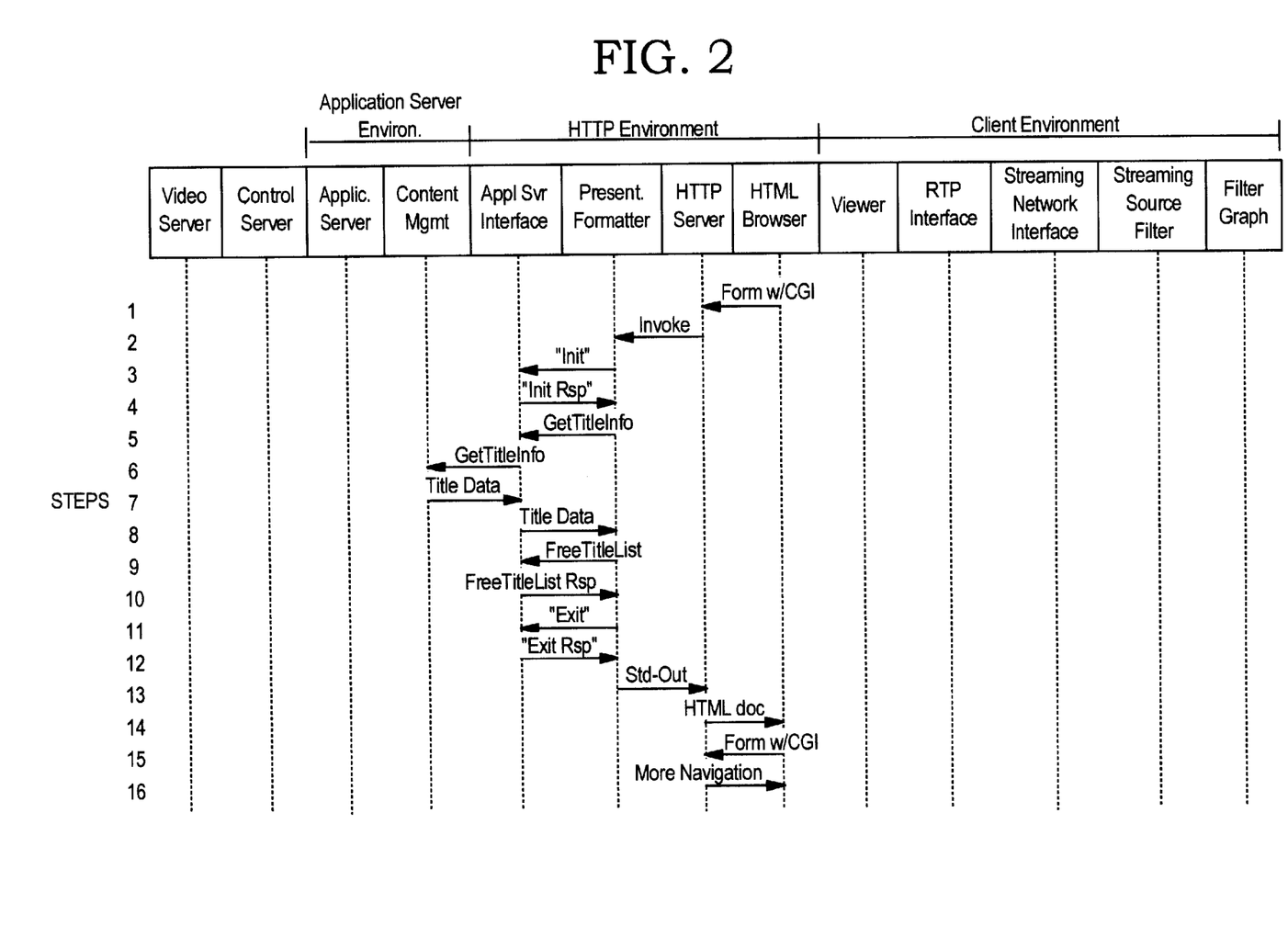
FIG. 2 illustrates a user navigation process.

Referring next to FIG. 2, there is illustrated a user navigation process. In step 1, the HTML browser 126 within the client computer 101 connects to the HTTP server 102 and submits a form with a CGI specification. In step 2, the form URL specification causes the presentation formatter 125 within server 102 to be invoked. The form data is passed to the CGI program via a standard input. In step 3, the presentation formatter 125 calls ASIL 124 to initialize ("Init") the session with the presentation formatter 125. The Init function allocates memory for saving information that the ASIL 124 requires. This information is saved between the various calls that the presentation formatter 125 (CGI programs) can make to the ASIL 124. Certain calls made to the ASIL 124 need information from previous calls (there is some order dependency on the calls a CGI program can make). This allocated memory area in the Init function is used for that purpose. In step 4, this call from the presentation formatter 125 to the ASIL 124 is returned ("Init" Rsp). The Init RSP acts as an acknowledgment, since any of the calls can return a bad response code indicating the function failed to perform as expected. The CGI program would need to check a return code to make sure the function was successful.

In step 5, the presentation formatter 125 calls the ASIL 124 to send a request to application server 103 for title information (GetTitleInfo). In step 6, the ASIL 124 establishes a communications session with application server 103, and sends the "GetTitleInfo" request to the content manager 120 within server 103. In step 7, the title information (data) is retrieved from the titles database 106 and passed back to the ASIL 124. In step 8, the title information is passed back to the presentation formatter 125 from the ASIL 124. This information will be formatted into an HTML document for later presentation to the client computer 101 (step 14).

In step 9, the presentation formatter 125 calls the ASIL 124 to free the data (FreeTitleList) which was used to return the title information. When a title search is performed, the title information is returned to the presentation formatter 125 (CGI program) in one or more areas of memory within the computer. The amount of memory to be used is not a fixed amount, because each users' search may be different and will result in different sets of data being returned to the CGI program, so the program uses a method of sending back the title data by dynamically allocating memory to hold the results of the search request. That memory is reserved for storing the title information until the CGI program is done with formatting its response and no longer needs the information. When the CGI program is done, a "well-behaved" program will clean-up (or free) the memory it reserved (FreeTitleList) so that it can be used by other processes that may need to use the memory. Failure to free the memory, in certain situations, can result in all the memory in a computer system being used up (exhausted) and would result in failure and restart of the computer system. In step 10, this call is returned (FreeTitleList Rsp).

In step 11, the presentation formatter 125 calls the ASIL 124 to exit the session ("Exit") with the presentation formatter 125, and in step 12, this call is returned from the ASIL 124 ("Exit Rsp").

In step 13, the presentation formatter 125 writes the HTML document to standard out (Std-Out). As discussed previously, a CGI program has the ability to tailor its output to a user's request and to send that tailored output to the user via standard out. The HTML document is the search response output formatted using HTML mark-up language so that a web browser 126 can display a customize search response to the user. In step 14, the HTTP server 102 sends the HTML document to the HTML browser within the client computer 101 for presentation to the client user. In steps 15 and 16, more iterations of steps 1–14 may occur as needed for client selection.

Figure 3:
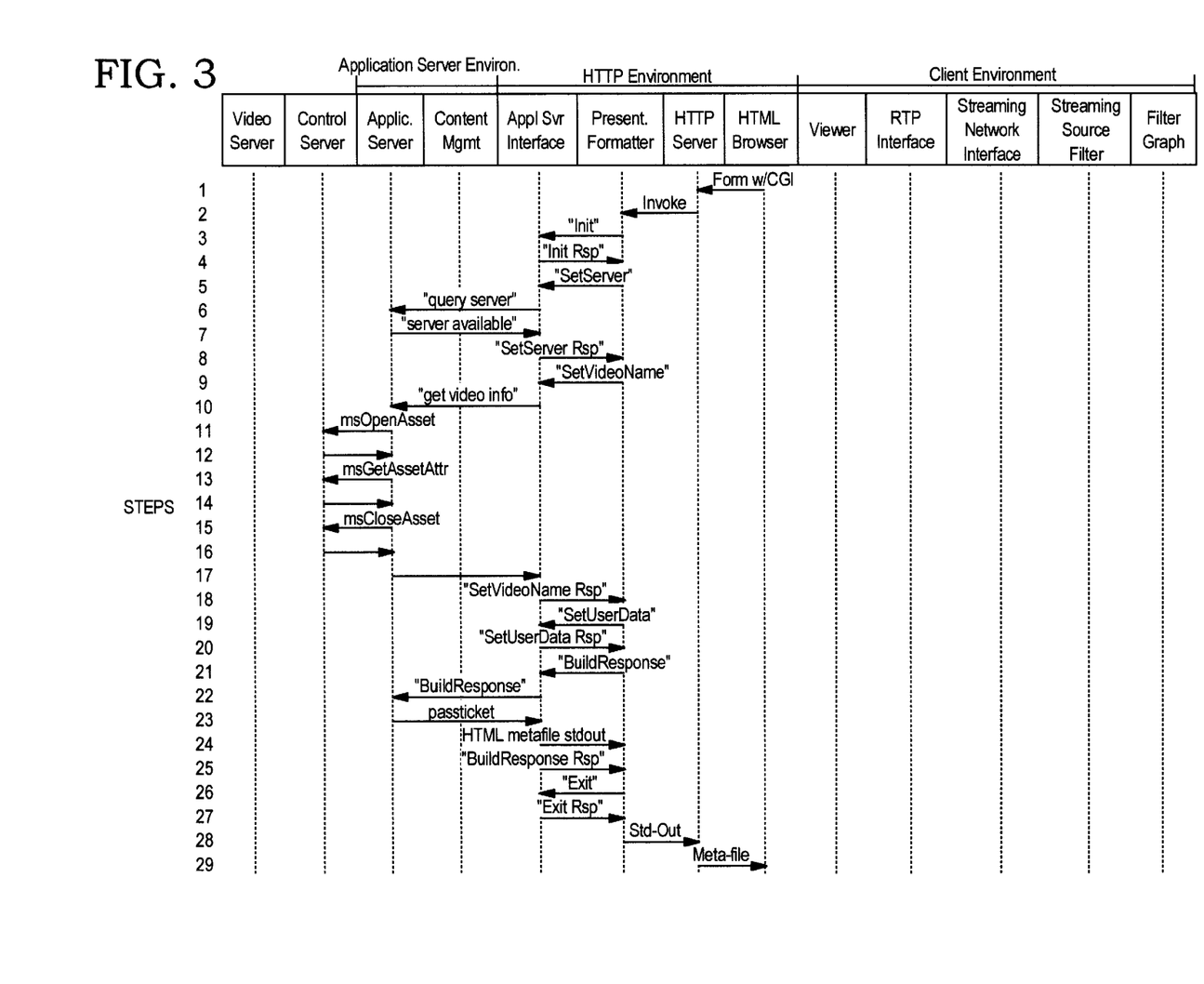
FIG. 3 illustrates a title selection process.

Referring next to FIG. 3, there is illustrated a process for title selection. In step 1, the HTML browser 126 within the client computer 101 connects to the HTTP server 102 and submits a form. In step 2, the form URL specification causes the presentation formatter 125 to be invoked. The form data is passed to the CGI program via a standard input. In step 3, the presentation formatter 125 calls the ASIL 124 to send a request to the application server 103. In step 4, the ASIL 124 responds to the request. In steps 5–8, the presentation formatter 125 calls the ASIL 124 to send a request to set the address ("SetServer") of application server 103. The ASIL 124 calls server 103 to make sure it is available ("query server").

In step 9, the presentation formatter 125 calls the ASIL 124 to set the video name ("SetVideoName"). In step 10, the ASIL 124 calls application server 103 to get information about the video.

In steps 11–16, application server 103 calls control server 105 to verify that the video is valid and to retrieve the metafile information such as bit rate, movie type, etc. (msOpenAsset, msGetAssetAttr, msCloseAsset). In steps 17–18, application server 103 returns the video information to the ASIL 124, which saves this information and returns it to the presentation formatter 125 ("SetVideoName Rsp").

In steps 19–22, the presentation formatter 125 calls the ASIL 124 to save the information for inclusion in an upcoming "Build Response." The SetUserData call is optional and allows a CGI program to save data that might be important for a billing or tracking purpose later in the playing of the video. For example, the data might be a credit card number or a customer number. This data is eventually saved by the request handler 122 and can be passed to a user-billing routine, along with information about the video playtime, etc. This would enable a company to set up a billing structure similar to the phone company (e.g., billed by the amount of time the video was playing).

To reduce the network load, the SetUserData information is not immediately passed over to the request handler 122. Instead, it is stored in the memory structure allocated by the Init call noted above. The information is sent to the request handler 122 in the BuildResponse call that follows it. The BuildResponse call passes information to the request handler 122 about what video(s) are selected for playing and any user data that might be associated with the play request. It is at this stage that the request handler 122 saves the information about the video(s) that were selected for playback and generates the passticket that is eventually returned to the user in the metafile.

When the request handler 122 completes its handling of the BuildResponse call, it returns a passticket to the ASIL 124 (step 23). The ASIL 124 then builds a metafile containing the video names, attributes, and the passticket, and writes the metafile data to standard out (step 24). Since the ASIL 124 is included as part of the CGI program when it writes data to standard out, it is treated the same as if the CGI program wrote the data.

In steps 26–27, the presentation formatter 125 calls the ASIL 124 with the "Exit" command to release storage allocated during the "Init" call. The ASIL 124 returns to the presentation formatter 125. In step 28, the presentation formatter 125 returns to the HTTP server 102. In step 29, the HTTP server 102 sends the metafile (with the passticket) to the HTML browser 126 within the client computer 101 via connection 140.

Figure 6:
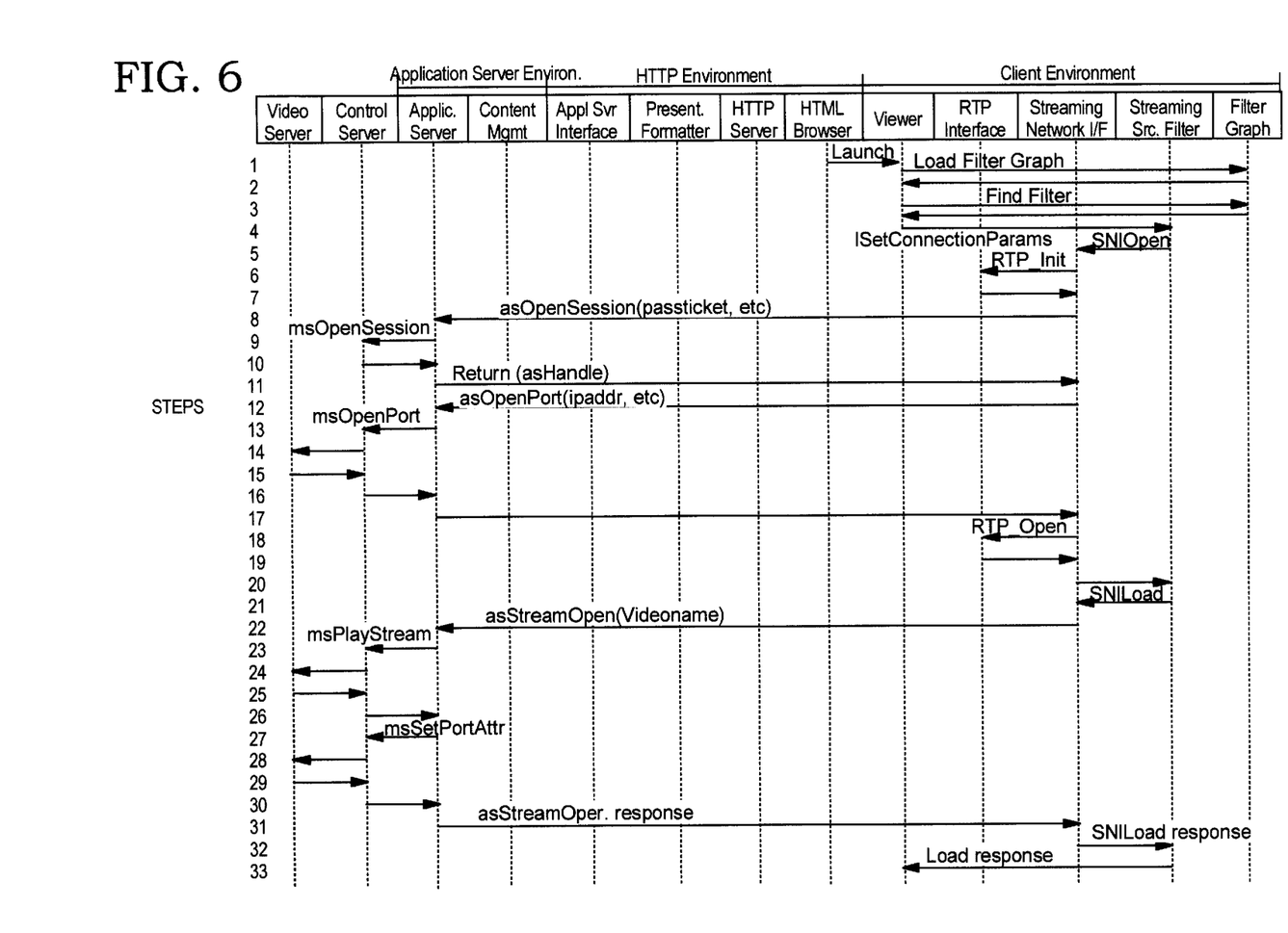
FIG. 6 illustrates an open session process.

Referring next to FIG. 6, there is illustrated a process whereby a session between the client 101 and the application server 103 is opened and where the passticket of the present invention is validated and the video names are validated. In step 1, the browser 126 evaluates the beginning of the metadata returned from the HTTP server 102 and uses that information to Launch the viewer program 127. The name of the (temporary) metafile is passed to the viewer program 127 as a command line parameter. In step 2, the viewer program 127 reads the input data and invokes the filter graph (not shown, but part of multimedia subsystem 141) with a Load Filter Graph for the appropriate data type. The filter graph is a mechanism that controls the video playback and is the part that is set up or changed to enable the streaming source filter 128 to be used for input instead of the normal mechanism of reading the file off of the client computer's 101 hard disk (not shown). Commands such as play are sent from the viewer program (or user's screen) to the filter graph component, which then sends it to the streaming source filter 128 and then to the streaming network interface 131, etc.

In step 3, the viewer program 127 calls the filter graph to find the streaming source filter 128. Thereafter, in step 4, the viewer program 127 calls the streaming source filter 128 with ISetConnectionParams to initiate a connection. In step 5, the streaming source filter 128 calls (SNIOpen) the streaming network interface 131 to set up an RTP connection. In steps 6 and 7, the streaming network interface 131 calls the RTP interface 130 to allocate a UDP port 160 and set up for an RTP connection.

In step 8, the streaming network interface 131 sends an asOpenSession command. It is within step 8 that the passticket is sent back in from the client 101 to the application server 103 so that it can be validated. It is at this step that the application server 103 verifies the passticket (e.g., compare values) and then looks at the videos that can be played with that ticket.

In steps 9, 10, and 11, the application server 103 opens the control server 105 session. This returns the "asHandle", which is an N-digit correlation number that the client 101 must send in on all further requests, and the application server 103 associates the allowed video play list with this N-digit number referred to as the asHandle. It is at this point that any reference to the passticket is discarded or destroyed. The application server 103 will invoke the ProcessUserData command to pass the open session information to the process user data daemon.

In steps 12–16, the application server 103 opens a video server port to the client 101. The open port call basically informs the video data pump 104 what the TCP/IP address is of the client 101, so that it can correctly send the video data. In step 17, the OpenPort command returns parameters for the broadband session which will be opened when StreamOpen occurs. These parameters return the server IP address. In step 18, the streaming network interface 131 calls the RTP interface 130 to begin accepting data from the video server 104. Initially, data from any port on the server ipaddr will be received.

In step 19, the RTP open call returns. In step 20, the streaming network interface 131 open call returns. In step 21, the streaming source filter 128 code invokes the streaming network interface 131 to load a video (SNILoad).

In step 22, the open stream call (asStreamOpen) flows to the application server 103. The video name is passed. The video name is sent in on the StreamOpen (asHandle is also sent in on that call). When the asStreamOpen call is received, the video name is validated from the list associated with the asHandle to make sure the client 101 is able to play the video that the client 101 requested.

In step 23, the video name is validated, then a play stream command (msPlayStream) flows to the control server 105. In step 24, the play stream command flows to the video server 104. In steps 25 and 26, the play stream command returns. In step 27, the application server 103 issues msSetPortAttributes in order to enable file byte offset in the RTP header. In steps 28–32, the OpenStream positive response is sent back. Within step 31, an additional handle is sent back to the client (asStreamHandle), which consists of two n-digit numbers. The first half of the handle is the asHandle returned in step 11, whereas the second half is a new n-digit number to identify the video that was just validated in the asOpenStream call. In step 33, the load response is returned to the viewer 127.

If in step 8 described above, an invalid passticket is sent from client 101, the TCP/IP session is closed. This will force the client 101 to reopen its TCP/IP session to the application server 103 and reduces the possibility of an attack by a computer hacker, since a hacker cannot just reissue the open session call with another number. This reduces the possibility that a hacker could attempt to get through by correctly guessing a passticket number, because a TCP/IP session open is a relatively time-consuming event.

If the request from the client 101 includes an invalid video identification, then a bad return code is sent to the streaming network interface 131 in step 22. This error does not close the session, but the client 101 will only receive a good response when the correct video name is sent on the asStreamOpen call in step 22. The asStreamOpen call could be reissued by the client program without requiring the user to get another passticket (however, this could be easily modified to terminate the TCP/IP session if an invalid video title is requested).

Figure 4:
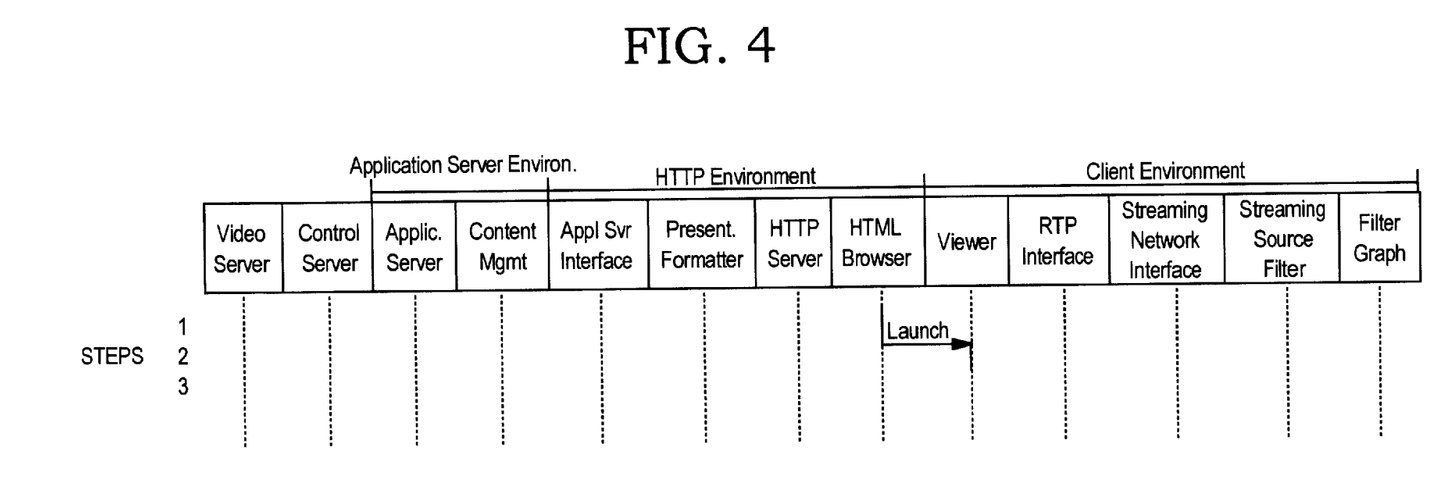
FIG. 4 illustrates a process for rejecting a selection of a title.

Referring next to FIG. 4, there is illustrated a process whereby the passticket expires. In step 1, the browser 126 within the client computer 101 evaluates the beginning of the metadata returned from HTTP server 102 and uses that information to launch the viewer program. Next, in step 2, the viewer 127 reads the input data and checks to see if the viewer 127 is configured to play the selected video type. In this example, the user has selected an incompatible video type (for example, QuickTime). The viewer 127 displays a message to the user informing the user of the error and then exits. In step 3, the passticket for the selection expires on the application server 103, and the application server 103 cleans up its queues. Note that this expiration is a passive event. No data has flowed between client 101 and application server 103.

Figure 5:
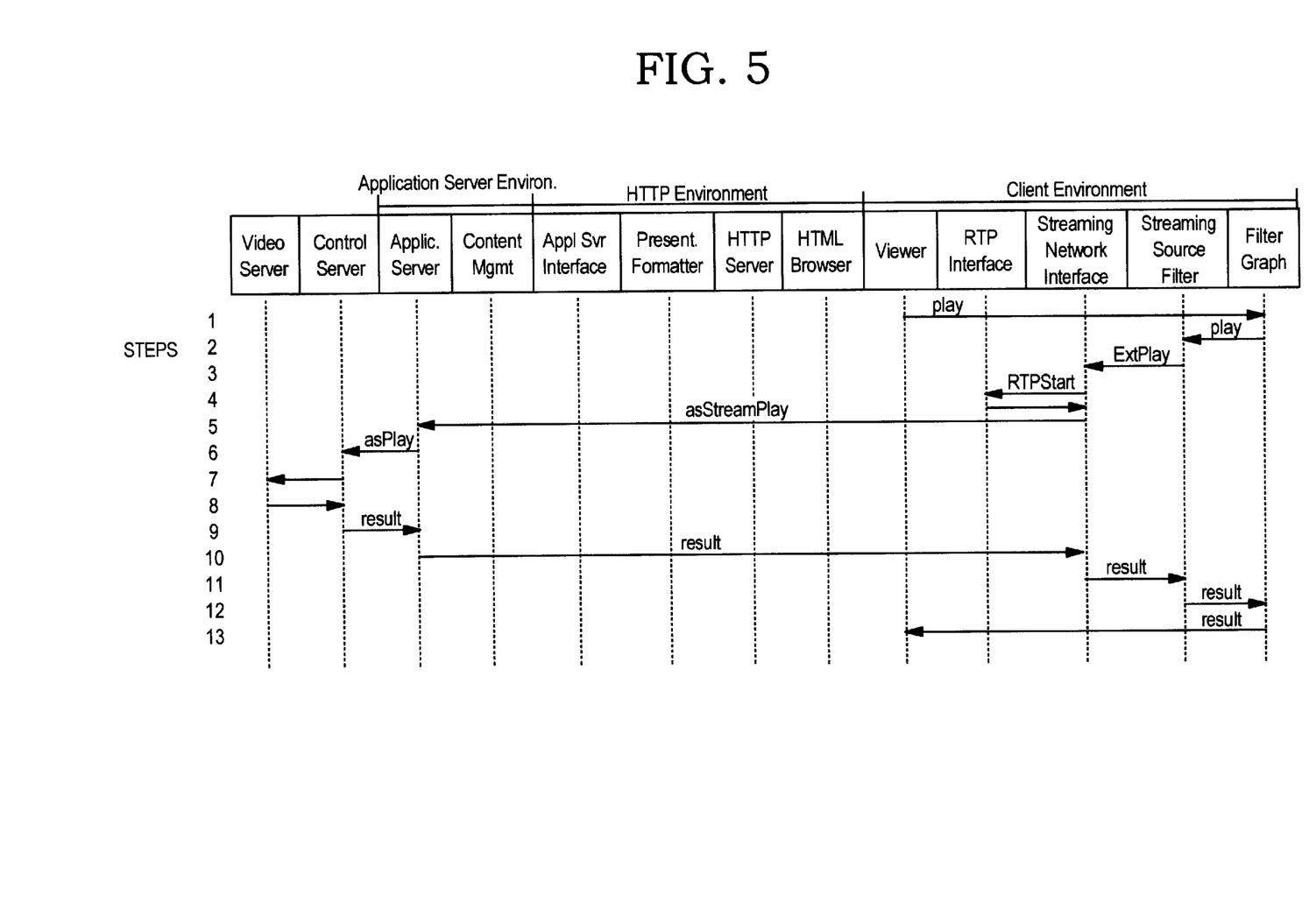
FIG. 5 illustrates a successful play process.

Referring next to FIG. 5, there is illustrated a successful play flow. In step 1, a play command issued by the viewer 127 is sent to the filter graph. In step 2, the streaming source filter 128 within the client computer 101 receives the play command from the filter graph. In step 3, the streaming source filter 128 calls the streaming network interface 131 with a play command (SNIPlay). In step 4, the streaming network interface 131 calls RTP 130 with a start command (RTPStart). In step 5, the streaming network interface 131 packages the request and performs a communications call to the application server 103 over connection 141 (asStreamPlay).

In step 6, the application server 103 packages the request and performs a call (msPlay) to the control server 105. In step 7, the control server 105 determines which video server 104 the command is for, then sends the command to that particular video server 104.

In step 8, the video server 104 performs the play command and returns the result back to the control server 105. In step 9, the control server 105 returns the result to the application server 103. In step 10, the application server 103 returns the result to the streaming network interface 131 call in client computer 101.

In step 11, the streaming network interface 131 call returns the result to the streaming source filter 128 process. In step 12, a play command is issued to the filter graph. It will be starved if the data stream has not arrived yet. In step 13, the play result is returned to the viewer 127.

It should be noted that if for any reason the TCP/IP session 141 fails, the client 101 must go back and get a new passticket before restarting the session, since the passticket was destroyed/discarded as described above in FIG. 6.

Although the present invention and its advantages have been described in detail, it should be understood that various changes, substitutions and alterations can be made herein without departing from the spirit and scope of the invention as defined by the appended claims.

What is claimed is:

1. A process implemented within a first data processing system comprising the steps of:
   receiving a first request from a second data processing system coupled to the first data processing system over a computer network for information on a data portion;
   sending from the first data processing system the information on the data portion over the computer network accompanied with a passcode;
   receiving a second request from the second data processing system coupled to the first data processing system over the computer network for the data portion; and
   sending, from the first data processing system over the computer network, the data portion only if the second request includes the passcode.

2. The process as recited in claim 1, wherein the data portion is video or audio data and the information is a title of the video or audio data.

3. The process as recited in claim 1, wherein the computer network is an open network.

4. The process as recited in claim 3, wherein the open network is the Internet.

5. The process as recited in claim 4, wherein the first request originates from a web browser implemented in the second data processing system.

6. The process as recited in claim 5, further comprising the step of:
   not sending the audio or video data from the first data processing system to the second data processing system if the second request is for video or audio data other than the video or audio portion associated with the title accompanied by the passcode.

7. The process as recited in claim 5, further comprising the step of:
   not sending the audio or video data from the first data processing system to the second data processing system if the second request includes a passcode that does not match the passcode sent with the title.

8. The process as recited in claim 5, further comprising the step of:
   not sending the audio or video data from the first data processing system to the second data processing system if the second request is not received by the first data processing system within a specified time period.

9. A web server system comprising:
   an HTTP server operable for receiving from a web browser a first request over the Internet for title information on video or audio data stored within the web server system;
   a titles database operable for storing the title information;
   circuitry operable for retrieving the title information from the titles database in response to the first request and then sending the title information on the video or audio data over the Internet, wherein the metadata includes a passcode associated with the title information;
   an application server operable for receiving from a viewer application coupled to the web browser a second request over the Internet for the video or audio data; and
   a video server operable for sending, over the Internet, the video or audio data only if the second request includes the passcode.

10. The system as recited in claim 9, further comprising:
    a request handler coupled to the application server operable for not sending the audio or video data from the video server to the viewer application if the second request is for video or audio data other than the video or audio portion associated with the title accompanied by the passcode.

11. The system as recited in claim 9, further comprising:
    a request handler coupled to the application server operable for not sending the audio or video data from the video server to the viewer application if the second request includes a passcode that does not match the passcode sent with the title information by the HTTP server.

12. The system as recited in claim 9, further comprising:
    a request handler coupled to the application server operable for not sending the audio or video data from the video server to the viewer application if the second request is not received by the application server within a specified time period.

13. The system as recited in claim 9, further comprising:
    a request handler coupled to the application server operable for invalidating the passcode after the video or audio data is sent by the video server.

14. A computer program product adaptable for storage on computer storage media within a network server comprising:
    program code within the computer program product operable for receiving a first request over a computer network for information on a data portion;
    program code within the computer program product operable for sending the information on the data portion over the computer network accompanied with a passcode;

program code within the computer program product operable for receiving a second request over the computer network for the data portion; and program code within the computer program product operable for sending, over the computer network, the data portion only if the second request includes the passcode.

15. The computer program product as recited in claim 14, wherein the data portion is video or audio data and the information is a title of the video or audio data.

16. The computer program product as recited in claim 15, wherein the computer network is the Internet.

17. The computer program product as recited in claim 16, wherein the first request originates from a web browser.

18. The computer program product as recited in claim 17, further comprising:

program code operable for not sending the audio or video data if the second request is for video or audio data other than the video or audio portion associated with the title accompanied by the passcode.

19. The computer program product as recited in claim 5, further comprising:

program code operable for not sending the audio or video data if the second request includes a passcode that does not match the passcode sent with the title.

20. The computer program product as recited in claim 5, further comprising:

program code operable for not sending the audio or video data if the second request is not received within a specified time period.

21. The process as recited in claim 1, wherein the step of sending from the first data processing system the information on the data portion over the computer network accompanied with the passcode addresses the information on the data portion to the second data processing system, and wherein the step of sending from the first data processing system over the computer network the data portion only if the second request includes the passcode addresses the data portion for sending to the second data processing system.

* * * * *

UNITED STATES PATENT AND TRADEMARK OFFICE
CERTIFICATE OF CORRECTION

| | |
|---|---|
| PATENT NO. | : 6,502,137 B1 |
| APPLICATION NO. | : 08/948210 |
| DATED | : December 31, 2002 |
| INVENTOR(S) | : Lynn Erich Petersen et al. |

It is certified that error appears in the above-identified patent and that said Letters Patent is hereby corrected as shown below:

On the title page, item [75] inventors: Lynn Erich Peterson should read as follows:

Lynn Erich Petersen

Signed and Sealed this
Fourth Day of June, 2013

Teresa Stanek Rea
*Acting Director of the United States Patent and Trademark Office*